April 7, 1925. 1,532,470
L. BLACKMORE
VEHICLE HAVING BRAKES
Filed March 8, 1923
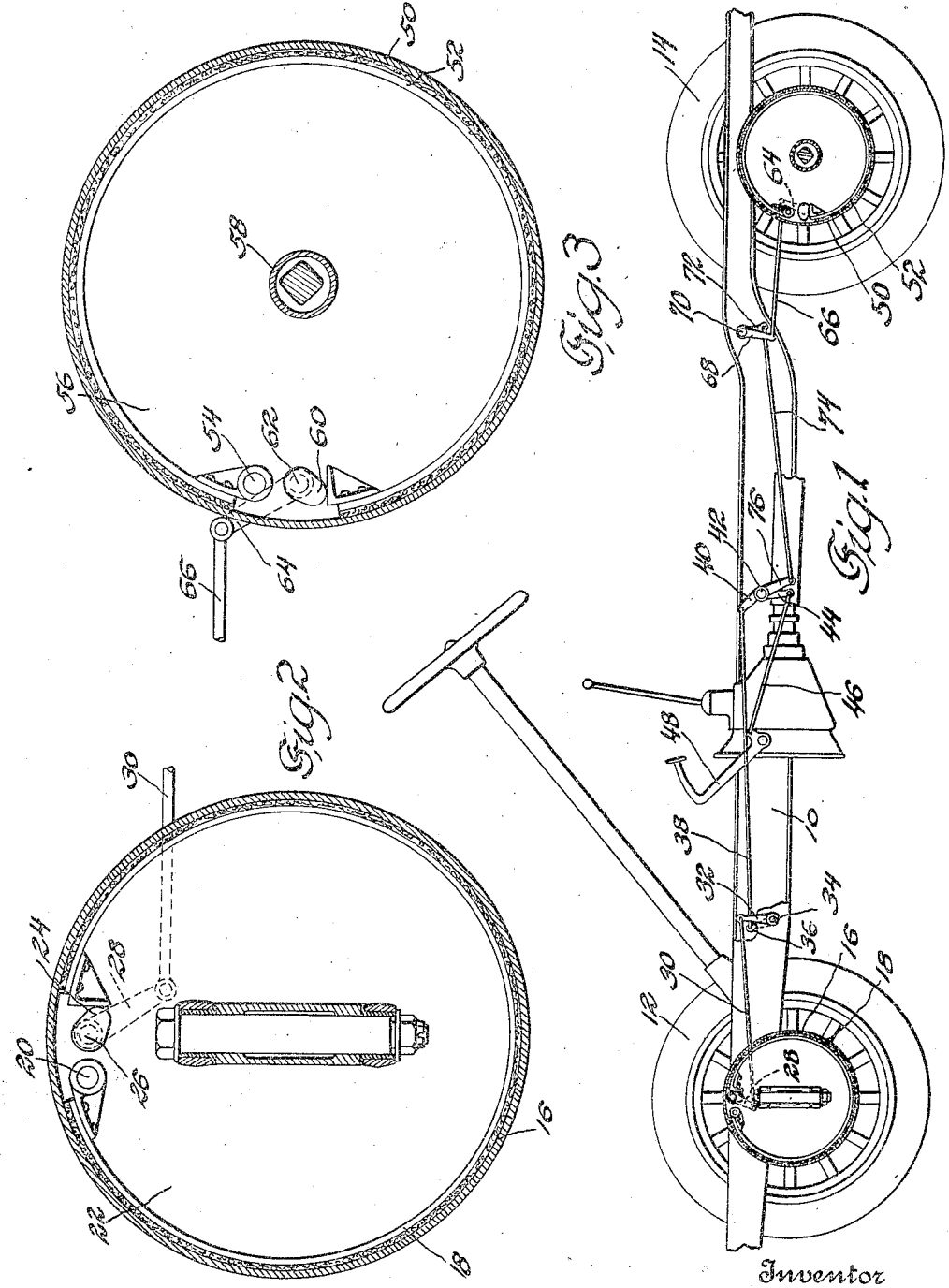
Inventor
Lloyd Blackmore 1,532,470

Patented Apr. 7, 1925.

UNITED STATES PATENT OFFICE.

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE.

VEHICLE HAVING BRAKES.

Application filed March 8, 1923. Serial No. 623,719.

*To all whom it may concern:*

Be it known that I, LLOYD BLACKMORE, a citizen of the United States, and a resident of Highland Park, county of Wayne, and State of Michigan, have invented certain new and useful Improvements in Vehicles Having Brakes, of which the following is a full, clear, concise, and exact description, such as will enable others skilled in the art to which the invention relates to make and use the same, reference being made therein to the accompanying drawings, which form a part of this specification.

This invention relates to vehicles having brakes, and is illustrated as embodied in an automobile having front and rear wheel brakes operated by a single controlling member such as the usual brake pedal.

An object of the invention is to provide an arrangement of a plurality of brakes, such as the four-wheel brakes shown in the drawings, so that different brakes will operate in a different manner according to the direction of movement of the vehicle so that some brakes will be most effective when the vehicle is moving forward and different brakes will be the most effective when the vehicle is moving in a rearward direction. In the present instance this arrangement is for the purpose of guarding against skidding, and to prevent loss of control of the vehicle, by arranging the brakes so that in either direction of movement that set of brakes will be most effective which is rearmost having regard to the direction of movement of the vehicle.

According to the preferred arrangement, the front wheel brakes are arranged to be most effective when the vehicle is moving in a rearward direction and the rear wheel brakes are arranged to be most effective when the vehicle is moving in a forward direction. By this arrangement the brakes always have a dragging effect with respect to the center of gravity of the vehicle, preventing the tendency to skid which takes place when, for example, the front wheels are braked more strongly than the rear wheels when the car is moving rapidly in a forward direction. In the illustrated embodiment of the invention the brakes are of what is known as the wrapping type, comprising expansible and contractable bands each of which is anchored at one end and arranged to engage an operating device at the opposite end. It will be observed that in the drawings, the anchored ends of the front wheel bands are arranged counterclockwise with respect to the operating devices, while the anchored ends of the rear wheel brakes are arranged clockwise from the operating devices, the vehicle being viewed with the front wheels at the left, thus securing the above described braking effect which reverses when the direction of movement of the vehicle is reversed.

The above and other objects and features of the invention, including various novel combinations and desirable particular constructions of parts, will be apparent from the following description of the illustrative embodiment of the invention shown in the accompanying drawings, in which:

Figure 1 is a diagrammatic longitudinal vertical section of an automobile just inside the wheels on the inner side; and Figures 2 and 3 are respectively large scale views of a front and a rear wheel brake from the same point of view as in Figure 1 but on a larger scale.

The vehicle shown in Figure 1 comprises a chassis frame 10 supported by springs (not shown) on front and rear axles carried by front wheels 12 and rear wheels 14. Each front wheel carries a drum 16 within which is arranged an expansible and contractable band 18 anchored at 20 to a plate 22 stationarily mounted on the steering knuckle for the corresponding wheel. The band is controlled by a cam 24 on a rock shaft 26 operated by an arm 28 connected by a link 30 to an arm 32 on a rock shaft 34, there being an arm 32 at each end of the rock shaft for the two front wheel brakes. Rock shaft 34 is operated by an arm 36 connected by a link 38 to an arm 40 on a brake operating shaft 42 having an arm 44 connected by a link 46 to the brake pedal 48 or an equivalent operating member.

Each rear wheel is provided with a drum 50 inside of which is arranged an expansible and contractable band 52 anchored at 54 to a plate 56 stationarily mounted on the casing 58 of the rear axle. The band is controlled by a cam 60 on rock shaft 62 carried by plate 56 and arranged to be operated by an arm 64 connected by a link 66 to an arm 68 on a rock shaft 70, there being an arm 68 on each end of the rock shaft for the two rear wheel brakes. Rock shaft 70 is operated by an arm 72 connected by a link 74 to an arm 76 on the brake operating shaft 42 which is operated by the brake pedal 48 as described above.

It is especially to be noted that, when viewing the car from the point of view of the drawings, the point 20 at which the front wheel brake band is anchored is counterclockwise from the cam 24 which operates the brake, whereas the point 54 at which the rear wheel brake band is anchored is in a clockwise direction from the cam 60 which operates the brake. As the forward direction of movement of the car is toward the left in these figures, it will be observed that the rear wheel brakes are more effective than the front wheel brakes when the car is moving forward and that the front wheel brakes are more effective than the rear wheel brakes when the car is moving backward. This, it will be seen, practically eliminates any tendency toward skidding, by reason of the fact that the most effective braking force is always behind the center of gravity of the car, which may be regarded as the point at which the momentum of the car is effective.

While one illustrative embodiment of my invention has been described in detail it is not my intention to limit the scope of the invention to that particular embodiment or otherwise than by the terms of the following claims:

I claim:

1. A vehicle having, in combination, front wheel brakes including bands each of which is anchored at one end and each of which has a cam at the other end, the cams being arranged clockwise from the anchored ends (regarding the vehicle with the front wheels on the left), rear wheel brakes including bands each of which is anchored at one end and each of which has a cam at the other end, the cams being arranged counterclockwise from the anchored ends, and driver-controlled connections for rocking the cams to apply the brakes.

2. A vehicle having, in combination, brakes including bands each of which is anchored at one end and each of which has a cam at the other end, the cams being arranged clockwise from the anchored ends, different brakes including bands each of which is anchored at one end and each of which has a cam at the other end, the cams being arranged counterclockwise from the anchored ends, and driver-controlled connections for rocking the cams to apply the brakes.

In testimony whereof I affix my signature.

LLOYD BLACKMORE.